May 5, 1964          B. TUROVLIN          3,132,077
NUCLEAR REACTOR FUEL ELEMENT WITH ATTACHED THERMOCOUPLE
Filed Aug. 17, 1959
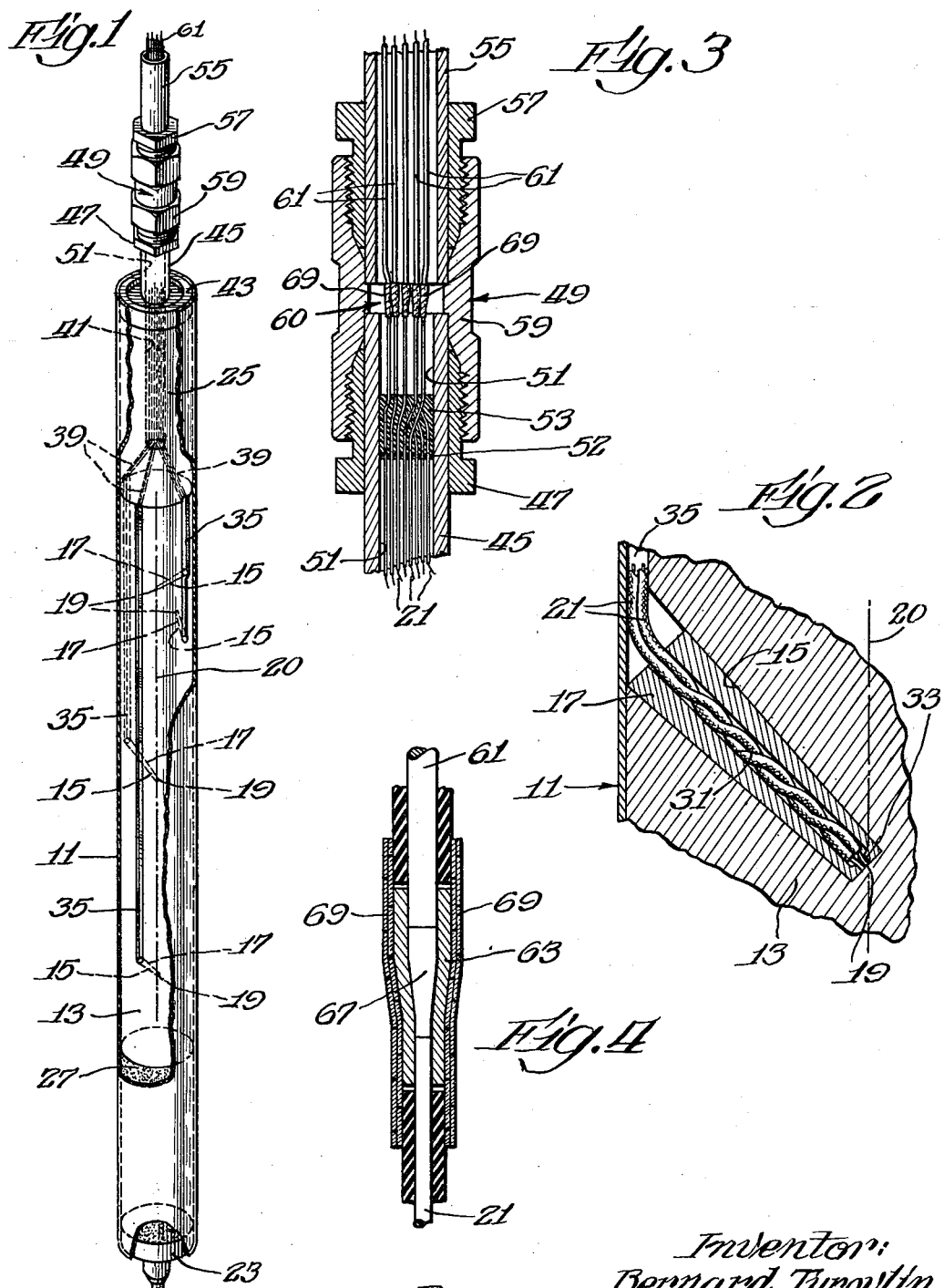

United States Patent Office 3,132,077
Patented May 5, 1964

3,132,077
NUCLEAR REACTOR FUEL ELEMENT WITH ATTACHED THERMOCOUPLE
Bernard Turovlin, San Diego, Calif., assignor to General Dynamics Corporation, New York, N.Y., a corporation of Delaware
Filed Aug. 17, 1959, Ser. No. 834,124
4 Claims. (Cl. 176—68)

The present invention relates generally to fuel elements for a nuclear reactor, and more particularly, to a fuel element construction which provides means for determining, under operating conditions, the temperature at various selected points within the fuel element.

The principal object of the invention is the provision of a fuel element incorporating means affording measurement of the temperature at selected points in the fuel element containing the fissionable material. A further object of the invention is the provision of such fuel element having characteristics which are not significantly different from a similar fuel element which does not include means for determining the temperature at selected points within the fuel element. Still another object of the present invention is the provision of a fuel element incorporating temperature indicating means which is simple in construction and effective over a wide range of operating temperatures. Other objects and advantages of the invention will be understood by reference to the following description and to the accompanying drawings in which:

FIGURE 1 is a perspective view, partially broken away, of a fuel element embodying various features of the invention;

FIGURE 2 is an enlarged sectional view of a portion of the fuel element shown in FIGURE 1, illustrating the arrangement for locating a thermocouple within the fuel element;

FIGURE 3 is an enlarged sectional view of that portion of the fuel element construction which includes the coupling shown at the top of FIGURE 1; and FIGURE 4 is an enlarged view, partially in section, of one of the connectors shown in FIGURE 3 and the parts attached thereto.

As shown in the drawings, a fuel element in accordance with the invention includes a sealed can or container 11 in which is located a fuel body 13 of an alloy containing fissionable material. Situated within the fuel body 13 are a series of vertically spaced tapered recesses 15 which extend inwardly of the fuel body to spaced points adjacent the center line thereof and, in one instance, extends horizontally across the fuel body to a location adjacent the outer surface or skin of the fuel body. In each of the recesses 15 there is received a tapered insert 17 of a fissionable alloy which carries a thermocouple 19 at its inner end. Each of the thermocouples 19 comprises a pair of wires 21 of dissimilar metal which are joined together and produce a measurable thermal E.M.F. proportional to the temperature at the juncture of the wires. Each of the wires 21 extends out of the container 11 for connection with a suitable measuring device (not shown) which is calibrated to indicate the E.M.F. generated by the thermocouple.

The can 11 in which the fuel body 13 is contained is fabricated from aluminum in the form of an elongated cylinder having welded at one end, which shall be referred to as the bottom, a bottom plug 23 which seals the bottom of the can and provides means for locating the fuel element in a suitable support or grid. Of course, the can 11 may be constructed with other shapes and from other materials and still obtain the advantages of this invention.

The fuel body 13 is located centrally within the can 11 and takes the form of an elongated cylinder having an outer diameter corresponding with the inner diameter of the can. While various fissionable alloys can be used, one fuel body which has been utilized consisted of a solid, homogeneous, hydrided zirconium uranium alloy (e.g. approximately 91% zirconium, 8% uranium, 1% hydrogen). The fuel element illustrated in the drawings, which fuel element is of the general form utilized in a specific reactor manufactured by the assignee of this invention, includes on each side of the fuel body 13 a cylinder of graphite 25 and 27. This graphite functions both as a moderator and as a neutron reflector.

As mentioned previously, the fuel body 13 is provided with a series of recesses 15, all of which are generally identical and into which the thermocouple carrying inserts 17 are received for measuring the temperature within the fuel body at selected points. The recesses are each inwardly tapered to provide, in cooperation with the tapered inserts, a friction fit incident to driving the insert into the fuel body recesses. This provision provides for positive anchoring of the inserts, thereby positively locating the thermocouples 19 carried by the inserts 17. In addition, this provision results in an intimate contact between the inserts and the fuel body having good heat transfer characteristics.

Three of the recesses extend radially along a downward incline of about 45 degrees from points spaced along the length and around the circumference of the fuel body. The inner ends of the recesses are respectively located at points spaced along the center line 20 of the fuel body. The other recess extends horizontally across the fuel body from a point between the upper two inclined recesses 15 to a point just within the outer surface of the fuel body. Thus, the thermocouple located at this point measures the temperature at the skin or outer surface of the fuel body. It is apparent that the recesses can be appropriately located within the fuel body in order to determine the temperature at any selected point.

The inserts 17 are all generally of identical construction, being formed of fissionable alloy, and having a tapered outer surface corresponding to the shape of the recesses. In the preferred embodiment, the inserts 17 are of a zirconium uranium alloy which has substantially the same composition as the fissionable alloy in the fuel body with the exception that the alloy has not been hydrided. The use of this material avoids temperature perturbations which might otherwise occur if inserts were used of materials having thermal and/or fission characteristics different from those of the fuel body.

As noted previously, each of the inserts 17 carries at its inner end a thermocouple 19 which, as shown in FIGURE 2, is exposed to the fissionable material in the fuel body 13. In order to receive the thermocouple, each of the inserts is provided with a central passageway 31 (see FIGURE 2) which includes an opening 33 at the inner end of the insert which is of smaller cross section than the passageway proper, and which is sized to receive the bare ends of the thermocouple wires 21 in contacting relationship. The junction between the thermocouple wires is stabilized and the wires are fixedly secured in the opening 33 by welding them to the inner tip of the insert.

As the temperature within the fuel element may reach, under operating conditions, a temperature of between 600° C. and 800° C. the metals chosen for the thermocouples must be physically unaffected by these temperatures. In addition, the metals selected should not appreciably effect the reactivity of the fuel body and must produce a detachable change in E.M.F. which is proportional to the temperature change over the operating range and which can be reproduced for calibration in accordance with the sensitivity desired. These requirements have been satisfied in the disclosed embodiment through the use of 28 gauge "Chromel" and "Alumel" wires having glass braid insulation. "Chromel" is a trademark of the Hoskins Manufacturing Company of Detroit, Michigan, and is applied to a 90% nickel, 10% chrome alloy. "Alumel" is also a trademark of the Hoskins Manufacturing Company and is applied to an alloy of 95% nickel, the remaining constituents being aluminum and minor proportions of silicon and manganese.

The wires extend from the inner tip of the inserts 17 to the upper end of the fuel body 13 through passageways 31 in the inserts and through connecting grooves 35 which extend longitudinally along the outer surface of the fuel body. Above the fuel body 13 the wires 21 travel through a series of inclined holes or passageways 39 in the graphite cylinder 25 and merge into a single central vertical passageway 41 opening into the center of the top of the graphite cylinder.

The upper end of the container 11 is closed by an aluminum plug 43 which is suitably welded to the aluminum can or container in an inert atmosphere of argon gas. The plug 43 includes an upwardly extending hollow stem 45, the outer end of which extends into one male component 47 of a compression type coupling 49. The plug 43 includes a central bore 51 which is aligned with the central passageway 41 in the graphite cylinder 25 and through which the thermocouple wires 21 extend. This bore is closed by a polyethylene wafer 52 and by an epoxy, as indicated at 53, to seal the container 11, thereby preventing escape of the fissionable products, and in addition, to stabilize the thermocouple wires.

Connectable with the upper end of the fitting or coupling 49 is an aluminum tube 55 which extends to the exterior of the reactor. The aluminum tube 55, at its lower end, extends into the coupling 49 through a second male component 57 which is similar to the component 47. When screwed within the female socket 59, the components 47 and 57 provide a fluid-tight structural connection between the aluminum tube 55 and the can or container 11. The aluminum tube 55 can constitute one section, or can be assembled from a number of sections with compression couplings between adjacent sections.

As indicated by the numeral 60 in FIGURE 3, the "Chromel" and "Alumel" thermocouple wires are joined within the coupling 49 to insulated copper leads 61. In turn, the copper leads 61 extend through the aluminum tube to the exterior of the reactor and terminate in a connector suitable for connection with a device (not shown) for measuring the E.M.F. produced by the thermocouple so as to indicate the temperature at the thermocouple junction.

The thermocouple wires 21 are each electrically connected to one of the copper leads 61 through individual tubular copper connectors 63 (see FIGURE 4). Each connector 63 includes a central bore 67 which is formed with one end larger than the other. In this connection, the thermocouple wire 21 is silver soldered within the smaller end of the central bore, and the copper lead 61 is soft soldered within the bore at the large end. The entire electrical connecton is insulated by wrapping with a glass tape 69.

The described fuel element permits accurate measurement, under operating conditions, of temperatures up to 800° C. both at the skin and in the center of the fissionable alloy material. With the disclosed construction, temperature perturbations are avoided, and at the same time, the thermocouples are positively anchored. Moreover, the presence of the thermocouples has no significant adverse effect on the reactivity of the fissionable material.

Various features of the inventoin are set forth in the appended claims.

I claim:

1. A fuel element for a nuclear reactor, said fuel element comprising a sealed elongated container, an elongated fuel body containing fissionable material located in said container, said fuel body having a first recess extending inwardly of said fissionable material to adjacent the longitudinal center line of said fuel body and a second recess extending inwardly of said fissionable material to a point adjacent the outer surface of said fuel body, an insert of fissionable material in each of said recesses, said fissionable material in said inserts having similar heat transfer and nuclear characteristics as said fissionable material in said fuel body, and a thermocouple carried at the inner end of each of said inserts with the junction of said thermocouple exposed to said fissionable materials in said insert and in said fuel body, each of said thermocouples being constituted by a pair of wires which extend exteriorly of said container for connection to an indicating unit for measuring the temperature of said fuel body in the vicinity of said first and second thermocouples.

2. A fuel element for a nuclear reactor, said fuel element comprising a sealed container, a fuel body containing fissionable material located in said container, said fuel body having a recess therein, an insert containing fissionable material received in and substantially filling said recess, said fissionable material in said insert having similar heat transfer and nuclear characteristics as said fissionable material in said fuel body, a pair of wires constituting a thermocouple carried by said insert at its inner end with the junction of said wires exposed to said fissionable materials in said insert and in said fuel body, said insert including a passageway leading from the exterior of said fuel body to said thermocouple, said wires extending through said passageway and exteriorly of said container for connection to an indicating unit for measuring the temperature of said fuel body in the vicinity of said thermocouple.

3. A fuel element for a nuclear reactor, said fuel element comprising an elongated cylindrical container, a cylindrical fuel body located in said container, said fuel body consisting of an alloy containing fissionable material and having an outer diameter corresponding to the inner diameter of said container, a plurality of inwardly tapered recesses extending radially inwardly of said fuel element and terminating in longitudinally spaced apart relation to one another adjacent the center line of said fuel body, an additional inwardly tapered recess extending inwardly of said fuel body to adjacent the outer surface of said fuel body at a point spaced from the entrance of said additional recess, a tapered insert received in and substantially filling each of said recesses, said inserts consisting of an alloy of fissionable material having similar heat transfer and nuclear characteristics as said fissionable material in said fuel body, a thermocouple carried by each of said inserts at their inner ends with the junction of said thermocouple exposed to said fissionable materials in said inserts and in said fuel body, said thermocouples comprising a Chromel and an Alumel wire, a passageway in each of said inserts leading from said thermocouple to the outer surface of said fuel body, a groove along the outer surface of said fuel body leading from each of said passageways to one end of said fuel body, connecting means secured to said container at the end thereof corresponding with said one end of said fuel body, a barrier sealing said container at the end thereof corresponding with said one end of said fuel body, hollow means detachably connected to said connecting means and extending to the exterior of the reactor, said thermocouple wires being covered with glass tape insulation, extending through said passageways, through said grooves, through said barrier, thereby stabilizing said wires in relation to one another and in relation to said container, and being connectable through said hollow means with an indicating device for measuring the temperature of said fuel body in the vicinity of said thermocouples.

4. A fuel element for a nuclear reactor comprising a container, a fuel body containing fissionable material located in said container, said fuel body having a recess extending inwardly of said fissionable material to adjacent the center of said fuel body, an insert of fissionable material occupying said recess, said fissionable material in said insert having similar heat transfer and nuclear characteristics as said fissionable material in said fuel body, a thermocouple carried by said insert at its inner end with the junction of said thermocouple exposed to the fissionable materials in said insert and in said fuel body, and means connected to said thermocouple and extending exteriorly of said container for connection to an indicating unit for determining the temperature in the vicinity of said thermocouple.

References Cited in the file of this patent

UNITED STATES PATENTS

| | | |
|---|---|---|
| 2,856,341 | Kanne | Oct. 14, 1958 |
| 3,000,803 | Morris et al. | Sept. 19, 1961 |
| 3,051,641 | Guneratne et al. | Aug. 28, 1962 |

FOREIGN PATENTS

| | | |
|---|---|---|
| 791,011 | Great Britain | Feb. 19, 1958 |
| 565,732 | Belgium | Mar. 31, 1958 |
| 216,429 | Australia | July 28, 1958 |
| 1,193,261 | France | Apr. 27, 1959 |
| 844,211 | Great Britain | Aug. 10, 1960 |

OTHER REFERENCES

AEC Document IDO-16318, June 14, 1957, page 19.
IDO-16388, February 15, 1957.
ORNL-1537, March 11, 1954, pages 3-17.